7266X
D. Williams.
Flocking Mach.
No.
Patented Oct. 25, 1832
No Printed Specification Available
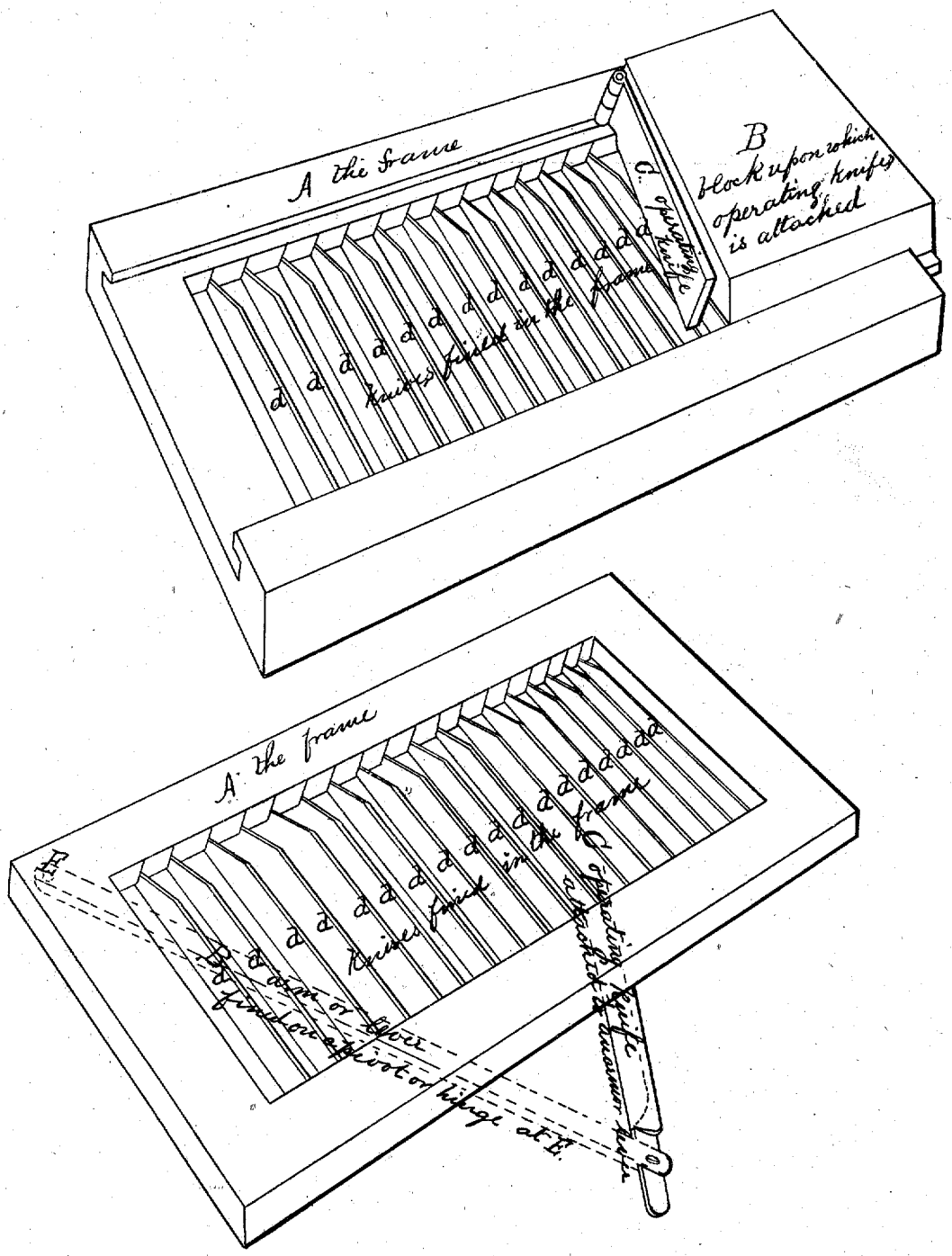

7266X

Denison Williams.

Letters Patent

Dated October 25th 1832.

The Schedule referred to in the Letters Patent and making part of the same containing a description in the words of the said Denison Williams himself of his improvement in the machine for cutting Fur from Pelts.

Fur skins are used for caps, muffs, tippets, trimming of various garments, lining of cloaks & other purposes, & the fur has hitherto been left on the skin entire. When taken off for hats & other purposes, the whole of the fur has been commonly separated from the skin or the skin cut up so as to be of no further use.

By the mode described in this specification long fur is partially cut off, having sufficient on the skin to answer for articles of dress. As the fur nearer to the skin is thicker & appears to be of a finer quality than the outer part, the skin is in fact increased in value by the operation & a considerable quantity of fur is also obtained for making hats & similar purposes.

The mode of effecting this operation is as follows:

A considerable number of knives are placed in a frame, the size of which should be according to the kind of skin from which the fur is to be cut. These knives are set within a quarter of an inch or less of each other, inclining at an angle of forty five degrees more or less, & are fixed in their position by having one end inserted in the frame. The opposite ends of the knives are made pointed so as to pass with facility thro' the fur in like manner as the teeth of a comb.

The sides of the frame may be plates of metal, or wood faced with metal. Two of these plates as before stated the knives are fixed, the other side is moveable & is put in after the knives are inserted into the fur. The width of the knives will determine the quantity of fur that is to be left on the skin, & of course should be made of different width according to the kind of fur skins to be operated upon.

The edges of the knives are on a level with the upper surface of the plates the whole making an even superficies.

The fur skins are spread under, & either attached to the frame or placed on a board, the knives inserted thro' the fur.

72660x Oct. 25, 1832

—— An operating knife, the ends of which rest upon the plates, may be made to pass over the superficies being so nicely adjusted as to shave off with neatness all the fur above the superficies aforesaid & should be moved in an oblique direction say at a plain angle of fifteen to forty five degrees. ——

. . . Another form of machine may be adapted of a simpler kind . . .

. . . The blade or a number of blades of the kind above mentioned are attached together & make, as it were one blade of a pair of shears, another blade answering the purpose of the operating knife before described, is so adjusted upon a springer a pivot as to pass over the superficies of the blade or blades at a plain angle of fifteen to forty five degrees. ——

—— The several constructions will be readily understood by reference to a drawing accompanying this specification. ——

Witneſses
Edwd. Radcliff
Morris M. Davidson

Denison Williams

[illegible] [illegible]